United States Patent [19]
Joubert et al.

[11] Patent Number: 4,809,952
[45] Date of Patent: Mar. 7, 1989

[54] SYSTEM FOR REMOTE ANCHORING AND TENSIONING OF AN ELONGATE ELEMENT

[75] Inventors: Philippe Joubert, Jouy en Josas; Yvon Castel, Croissy s/Seine, both of France

[73] Assignee: Institut Francais du Petrole, Rueil-Malmaison, France

[21] Appl. No.: 878,648

[22] Filed: Jun. 26, 1986

[30] Foreign Application Priority Data

Jun. 28, 1985 [FR] France ................... 85 09872

[51] Int. Cl.⁴ .............................. E21B 19/00
[52] U.S. Cl. ..................... 254/29 A; 29/452
[58] Field of Search ............ 254/29 A, 29 R; 29/452; 81/57.38

[56] References Cited

U.S. PATENT DOCUMENTS 4,433,828  2/1984  Spiegelman et al. ............. 254/29 A
4,438,901  3/1984  Reneau et al. ................... 254/29 A
4,523,742  6/1985  Reneau ........................... 254/29 A

FOREIGN PATENT DOCUMENTS 1360316   7/1972  United Kingdom .
1580034   5/1976  United Kingdom .
1590273   8/1977  United Kingdom .
2077873   5/1981  United Kingdom .
2136073   9/1984  United Kingdom .
2154465  10/1985  United Kingdom .

Primary Examiner—Frederick R. Schmidt
Assistant Examiner—Judy J. Hartman
Attorney, Agent, or Firm—Antonelli, Terry & Wands

[57] ABSTRACT

A system is provided for tensioning and anchoring an end of an elongate element on a support. The system has tensioning means, a fastening member for fastening the tensioning member to the end of the elongate element and anchorage dogs for fastening the support to the end of the elongate element.

12 Claims, 6 Drawing Sheets

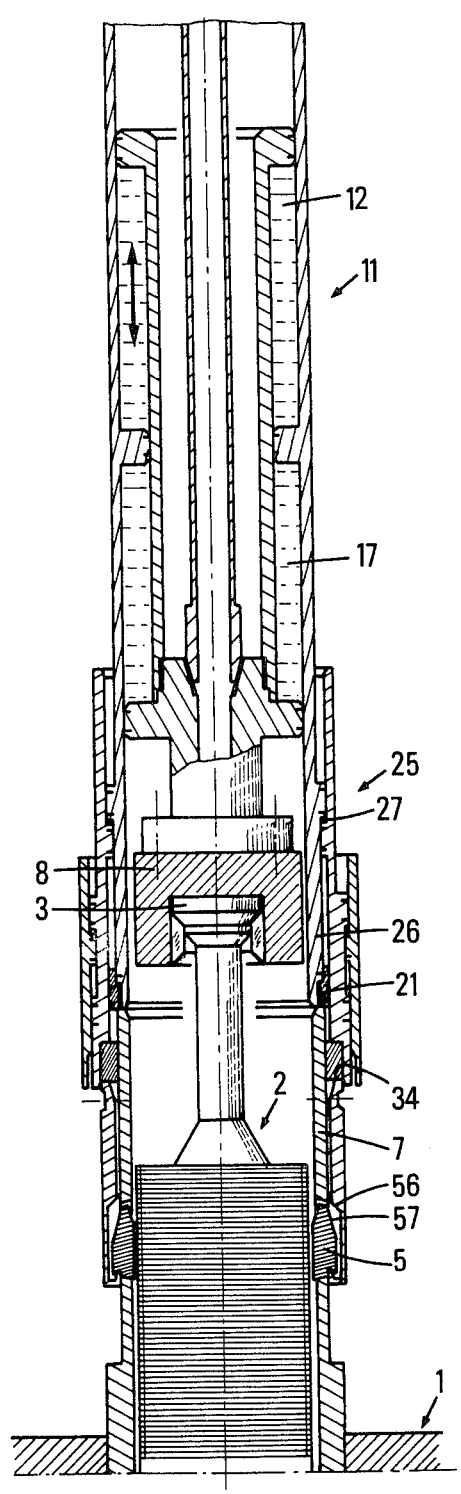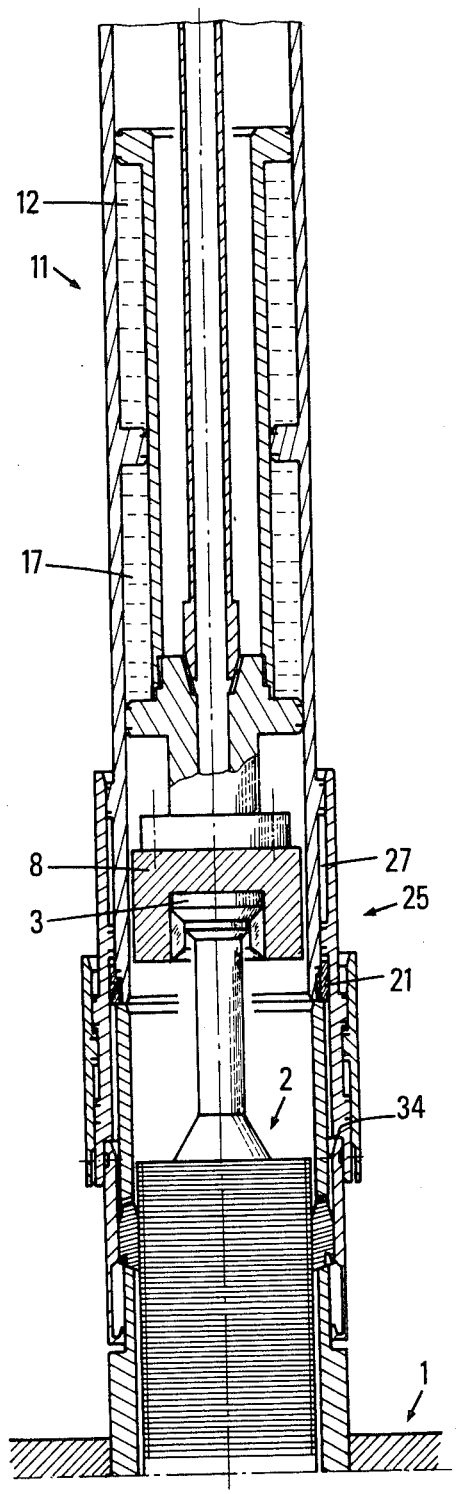

SYSTEM FOR REMOTE ANCHORING AND TENSIONING OF AN ELONGATE ELEMENT

BACKGROUND OF THE INVENTION

1. Field of the Invention

The present invention relates to a system for carrying out operations for remote tensioning and anchorage of the end of an elongate element such as a duct or pipe line on a support as well as the reverse operations.

The present invention may be used more particularly for fixing the upper end of an oil effluent production sea line to an underwater installation, the lower end of this duct being fixed to bottom equipment such as a well head or to a bottom manifold.

The present invention may be used for positioning all the lines forming an offshore oil production riser, such as production, gas injection, water lines, testing, electricity distribution, remote control, tool transfer lines as well as lines generally designated by the abbreviation TFL, etc. . . .

2. Description of the Prior Art

The French patent No. FR-A-2 136 317 has already proposed a system for connecting a pipe line to an immersed pipe. However, the device proposed allows neither continuous adjustment of the tensioning and anchorage nor the end to end connection of two coaxial pipes.

U.S. Pat. Nos. 3,452,815; 3,330,341; and 3,393,926 further show anchorage devices for maintaining two coaxial elements joined together. However, all these devices have no tensioning means.

SUMMARY OF THE INVENTION

The present invention relates to a system for carrying out operations for tensioning and anchoring the end of an elongate element on a support. The system of the invention includes, in combination, tensioning means, fastening means adapted for fixing the tensioning means to the end of said elongate element and anchorage means adapted for fixing said support to the end of said elongate element.

The fastening means may be located outside the end of the elongate element.

In the case where this end is hollow the fastening means may be located inside this end.

The fastening means may comprise a circular groove formed inside the end of the elongate element and at least one dog integral with the tensioning means, said dog having a profile adapted for cooperating with said circular groove so as to cause fastening of the tensioning means to the end of the elongate element.

This dog may be housed in an opening formed in a cylindrical tube in which a piston slides between two positions. In one of these positions, this piston pushes said dog outwardly into a position locking the fastening dogs in the groove.

This piston may be secured to the rod of a hydraulic jack.

The anchorage means may be located outside the end of the elongate element.

The anchorage means may include at least one retaining dog housed in an opening formed in a receptacle integral with the support. In addition, the end of the elongate element may have, over a part at least of its periphery, a profile adapted for cooperating with said retaining dog so as to interlock the support and the end of the elongate element.

The receptacle may comprise a first locking member which slides between two positions. In one of these positions, this member pushes the dog or dogs towards the end of the elongate element, thus locking the anchorage means of the end of the elongate element on the support.

This locking member may be actuated by a jack.

Similarly, the tensioning means may comprise a hydraulic jack; this jack may have an annular chamber substantially coaxial in operation and with end of the elongate element.

BRIEF DESCRIPTION OF THE DRAWINGS

The present invention will be better understood and its advantages will appear more clearly from the following description of particular examples, which are in no wise limitative and which are illustrated by the accompanying Figures in which:

FIGS. 4 to 8 show the sequencing of different phases during connection of the system of the invention.

DESCRIPTION OF THE PREFERRED EMBODIMENTS

In the case of the examples considered, the elongate element corresponds to a particular line of an assembly of lines which form a sea riser. This line may be an oil effluent production line.

Figure 1:
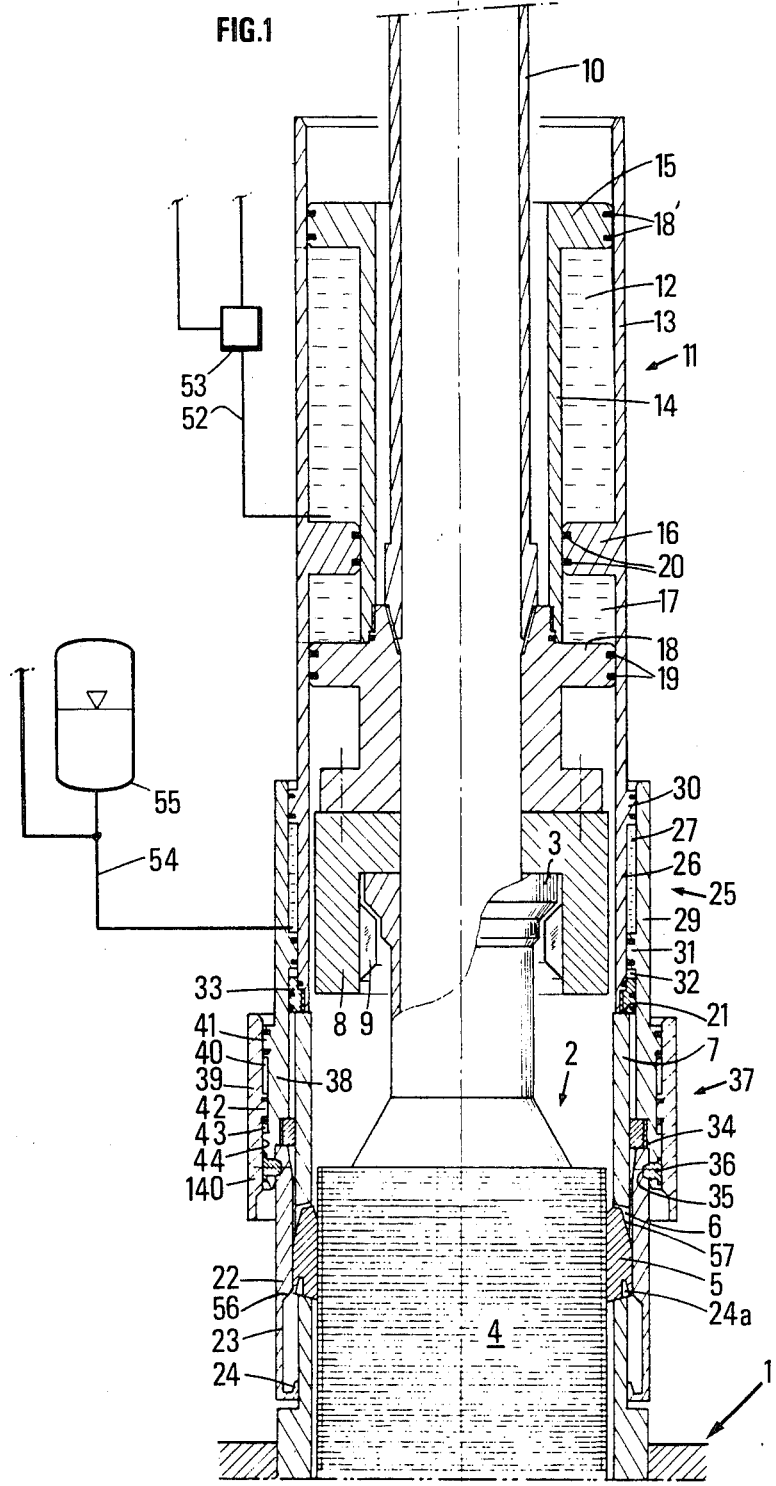
FIGS. 1 to 3 illustrate three variants of construction of the system of the invention.

Reference 1 in FIG. 1 designates a support on which a production line must be anchored after tensioning.

This support may for example be an immersed buoy. Reference 2 designates an upper end of the production line.

This end has a collar 3 for fastening the production line, as well as a serrated external part 4 having a serrated profile for cooperating with anchoring dogs 5.

These anchoring dogs 5 are housed in openings 6 formed in a receptacle 7 integral with support 1. In FIG. 1, this receptacle is a cylindrical sleeve.

Collar 3 of the production line 2 cooperates with a connector 8 having dogs 9 for fastening the production line 2. The system for fastening the end of the production line 2 to the tensioning system could also be formed for example by a bayonet fixing system. This connector 8 is secured to a suspension element 10 which is connected to an installation situated above the assembly shown in FIG. 1 and from which this assembly is lowered. Such an installation may be a floating sea installation. This suspension element 10 may for example be a tube, as shown in FIGS. 1, 6, 7 and 8. This tube 10 has the advantage of appreciably facilitating the positioning of the fastening and tensioning system on the elongate element and possibly of allowing fluids to be transported to or from the production line. A cable could also have been used for example as suspension element.

In the example shown in FIG. 1, tensioning of the production line will be achieved using tensioning actuator or dock 11 which are formed essentially by a hydraulic jack having a main chamber 12 for receiving or discharging a pressurized fluid.

References 13 and 14 designate the parts of this cylinder which move, one with respect to the other, during operation thereof and which are designated, respectively, as cylinder 13 and rod 14 of the tensioning actuator or jack 11.

In the example shown in FIG. 1, the main chamber 12 of jack 11 is annular and is defined by the external walls of rod 14 and the internal walls of cylinder 13, rod 14 being inside the cylinder 13, as well as by a first external collar 15 forming a piston fixed to the end of the rod 14 and an internal collar 16, forming a sealing shoulder, fixed in the cylinder 13.

The tensioning actuator 11 may be a double acting jack and may include a subsidiary chamber 17 defined by the internal collar 16 and a second external collar 18 fixed to the rod 14.

The internal collar 16 is situated between the first and second external collars 15 and 18. The different collars are dimensioned so as to substantially seal the main and subsidiary chambers 12 and 17. Such sealing may be reinforced by seals 19 and 20.

The cylinder 13 of the tensioning jack 11 may bear at 21 on the receptacle 7 which, in FIG. 1, is in the form of a cylindrical sleeve.

In the example shown in FIG. 1, the rod 14 of the tensioning jack 11 is secured to connector 8 and external collar of the suspension element 10.

The system of the invention may include a member for locking a anchorage dogs 5 in the position for anchoring the end of the production line 2.

This locking member includes a locking jacket 22 which slides between two positions.

The inner diameter of this jacket 22 is determined so that, when it is in a low position, it prevents disengagement of the anchorage dogs 5 from the serrated profile 4. This is shown in FIG. 1 where the jacket 22 is in the locking position. In this Figure it can be seen that the locking jacket 22 has, on its lower part 23, an inner diameter greater than that previously determined so as to allow disengagement of the anchorage dogs 5 when the locking jacket 22 is in the high position.

In addition, so as to facilitate disengagement of the anchorage dogs 5 the locking jacket 22 may have at its lower part one or two fingers 24 which will cooperate with notches 24a formed in the anchorage dogs 5 during lifting of the locking jacket 22.

In the case of FIG. 1, the position of the locking jacket 22 is controlled by a double acting actuating jack 25 which will be termed locking actuator.

The rod 26 of this actuator is interlocked with the cylinder 13 of the main actuator and, moreover, these two elements may form a single structure as shown in FIG. 1.

The main chamber 27 of the locking actuator 25 is defined by the rod 26 and by a cylinder 29 as well as by a collar 30 external to rod 26 and by a collar 31 internal to cylinder 29.

The subsidiary chamber 32 is defined by the internal collar 31, rod 26, cylinder 29 and a second external collar 33 integral with rod 26.

The arrangement as well as the geometry and equipments of these different collars are substantially the same as for the tensioning jack 11.

The cylinder 29 of the locking actuator 25 bears at 34 on the locking jacket 22.

So as to allow retraction or withdrawal of the member locking the anchorage dogs 5, the system of the invention may include means which will be termed retraction or withdrawal means adapted to allow retraction of the locking jacket 22 from its locking position.

These means include a groove 35 formed in the locking jacket 22. Fingers 36 cooperate with this groove.

These fingers 36 are integral with an actuator 37 which will be termed actuator for withdrawing the locking jacket 22.

This actuator 37 comprises a rod 38 which, in FIG. 1, is integral with the cylinder 29 of the locking actuator 25. It also includes a cylinder 39 whose lower part 140 has a first zone with a diameter such that, when this zone is at the level of fingers 36, cylinder 39 locks the fingers 36 in the groove 35 of the locking jacket 22.

The main chamber 40 of this actuator is defined by rod 38 and the cylinder 39 of this actuator for withdrawing the locking jacket 22, as well as by a first collar 41 external to rod 38 and a collar 42 internal to cylinder 39.

This actuator may optionally include a subsidiary chamber 43 making it double acting. This chamber is defined by rod 38, cylinder 39, the inner collar 42 and a second collar 44 external to rod 38.

In FIG. 1, the serrated zone 4 has a height relative to the height of the dogs which will allow adjustment of the extension or the tensioning force exerted on the production line 2 over a wide range of values.

In the embodiment shown in FIG. 1, the end part of the upper end 2 of the production line, which includes a collar 3, as well as the connector 8 are situated below the tensioning jack 11.

Figure 2:
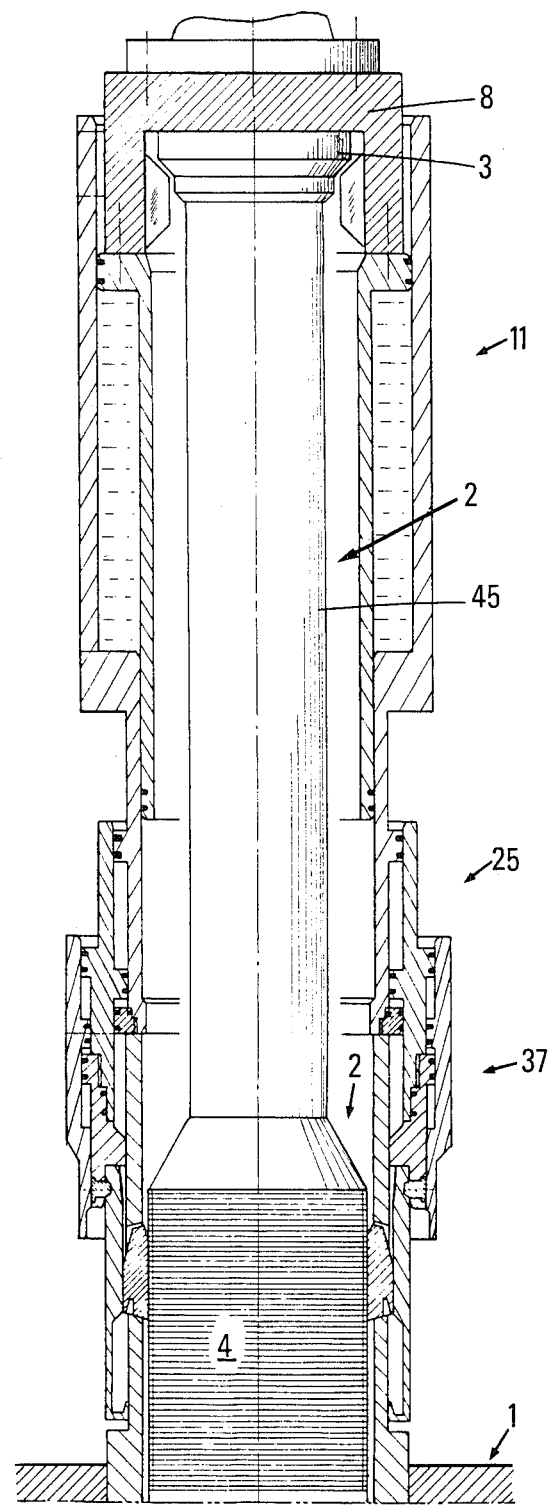

Conversely, in the embodiment shown in FIG. 2, the end part of upper end 2 of the production line, as well as connector 8, are situated above the tensioning actuator 11 through an extension 45 situated between collar 3 and the serrated external part 4.

Moreover, in FIG. 2, the tensioning jack 11 is a single acting cylinder.

Figure 3:
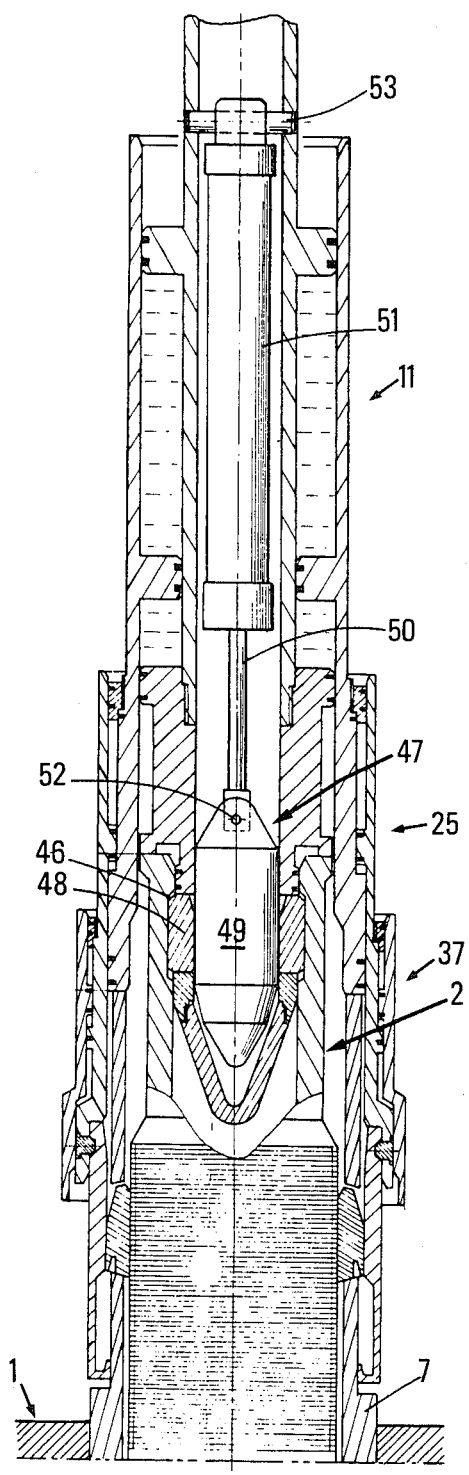

The embodiment of the system of the invention shown in FIG. 3 illustrates the case where the fastening means are situated inside the upper end 2 of the production line.

In this embodiment, the fastening means include a groove 46 formed inside the upper end 2 of the production line and a connector 47 having dogs 48 adapted for cooperating with groove 46.

Dogs 48 are held in an engaged position in groove 46 by a piston 49.

In FIG. 3, piston 49 is actuated by the rod 50 of a jack 51.

In this Figure two pins 52 and 52 will be noted giving the piston 49 two degrees of freedom in rotation.

Referring to FIG. 1, lock jacket 22 may include a device which prevents it from sliding under its own weight when it is in the raised position. Such a device could include a clamping seal or a mechanical system itself having a finger which would cooperate with a housing formed in an upper part of receptacle 7. The engagement and disengagement of such a device could be controlled by a rod extending from the upper edge of the locking jacket 22 and which would be actuated by contact 34 of cylinder 29 with this jacket 22.

Of course, there exist lines for conveying hydraulic fluid to and from the different chambers of the different actuators or jacks. These lines have not been shown so as not to complicate the drawings.

However as shown in FIG. 1, line 52 supplying the main chamber 12 of the main cylinder 11 with hydraulic fluid may include a pressure sensor 53 for determining the pressure in the chamber 12 so as to control the tension of the production line.

The line 54 supplying the main chamber 27 of the locking jack 25 with hydraulic fluid may be connected to an accumulator 55. Such a device will avoid the need for permanently checking the pressure in this line 54. This will be explained in greater detail below but is not, essential to the operation of the system of the invention.

This operation will be described by considering the embodiment of FIG. 1.

Figure 4:
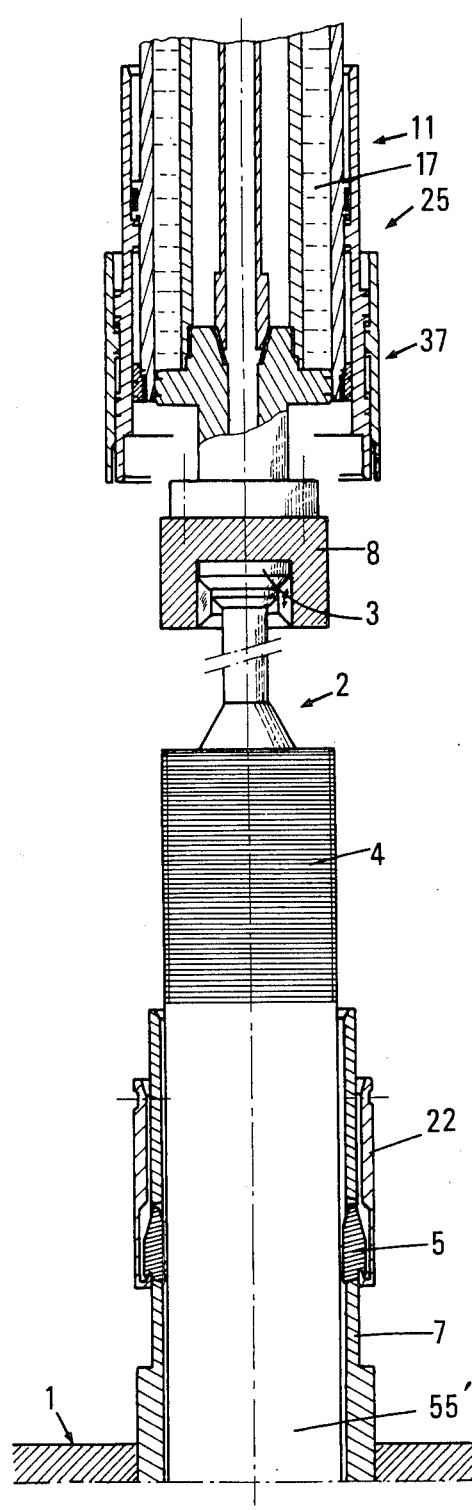

FIG. 4 shows lowering of the production line 55′ whose upper end 2 is fixed to a connector 8. Such lowering continues until the lower end of the production line 55′ is connected to a bottom installation. At the end of this connection, the system of the invention is substantially in the position shown in FIG. 5.

Figure 5:
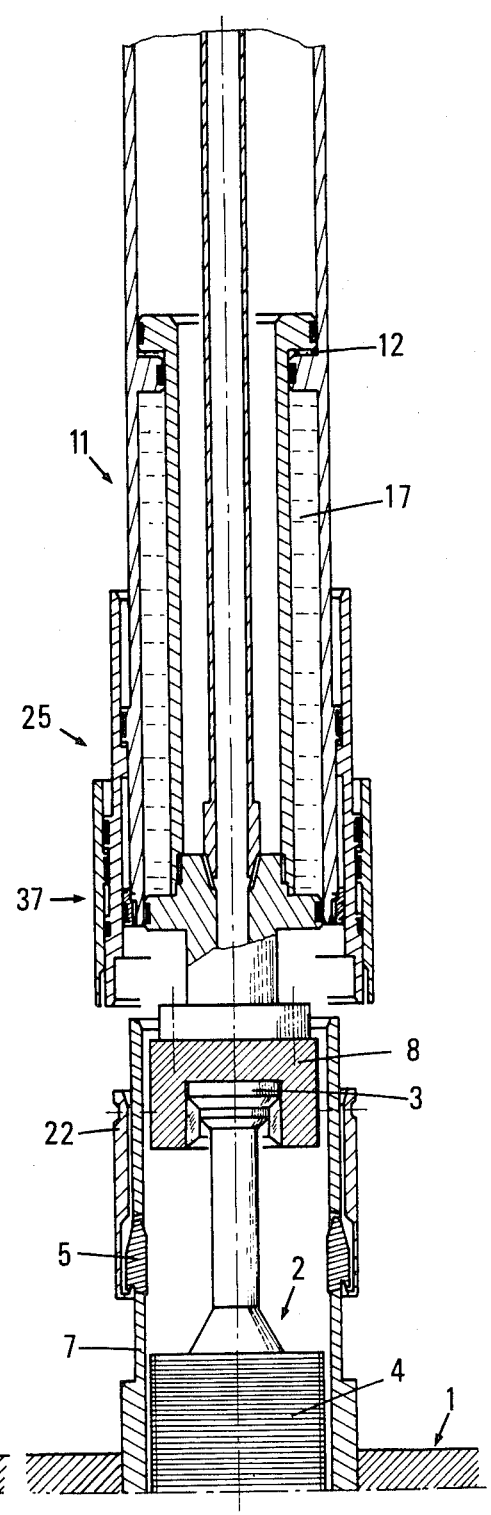

In FIGS. 4 and 5 the tensioning jack 11, the locking actuator 25 and the actuator 37 of the means for withdrawing the locking jacket 22 are shown with their cylinders raised, which corresponds to a minimum volume of the different main chambers 12, 27 and 40. This is in no wise limitative. Thus, for example, it will be possible to lower this assembly when the main cylinder 13 of the main actuator 11 is in the low position. Moreover, in this case, it may serve for damping the shock due to its contact at 21 with receptacle 7, because of the expanded main chamber 12. Once the lower end of the production line 55′ has been fixed to the bottom installation, the main actuator 11 is actuated by feeding fluid into the main chamber 12 of this actuator until the lower end of cylinder 13 of the main actuator comes into abutment, in the case where the main actuator is in the raised position. Injection of fluid into chamber 12 is continued so as to tension the production line. Such injection continues until the tensioning force is reached which it is desired to impose on the production line or until the desired extension has been reached.

From this moment, pressurized fluid is injected into the main chamber 27 of the locking actuator or jack 25. Cylinder 29 of this actuator moves down, bears at 34 on the locking jacket 22 and causes this jacket to move down until the edge 56 of the zone of this piece having a diameter determined for locking the anchorage dogs 5 in the engaged position meets these anchorage dogs 5.

From this time, two cases are possible:

A. Dogs 5 engage in the serrated profile 4. At that time, the locking jacket 22 continues its downward travel and locks the dogs 5 in their engaged position.

B. The profile of dogs is offset with respect to that of the serrations and the edge 55 is immobilized on the ramp 57 equipping the lower part of dogs 5.

The use of at least one main actuator acting as a tensioning means allows these means to be made adjustable for adjusting the intensity of the tensioning or extending force by the length of the serrated external portion 4 and the range of the positions at which the dogs 5 can provide anchorage.

The serrated external portion 4 as well as that of the anchorage dogs 5 may advantageously have a saw tooth shape.

From the moment when the locking jacket 22 is immobilized, because the profile of the anchorage dogs does not cooperate with the serrated profile 4, it is possible either to reduce the tension exerted on the end 2 of the production line, or to increase it, so as to slightly move the serrated profile 4 until the anchorage dogs 5 may engage in the serrated profile and the locking jacket 22 then continues its downward travel and locks the anchorage dogs 5. This is the case shown in FIGS. 1 and 7.

The accumulator 55 is useful when the edge 56 is immobilized on the ramp 57 of the dog 5. In fact, in this case it is sufficient to establish a pressure level in the supply line of the accumulator 55 and of chamber 27 and to isolate this line at the surface and not to bother with it any more. When the serrated profile 4 is moved and when dogs 5 are engaged therein, it is the accumulator 55 which will supply the volume of fluid required for feeding main chamber 27 of the locking actuator jack 15 without for all that causing the pressure to collapse. Once dogs 5 are locked, the tensioning forces are transferred from the bearing surface 21 to the anchorage dogs 5 by releasing the pressure in the main chamber 12 of the main actuator 11.

Figure 8:
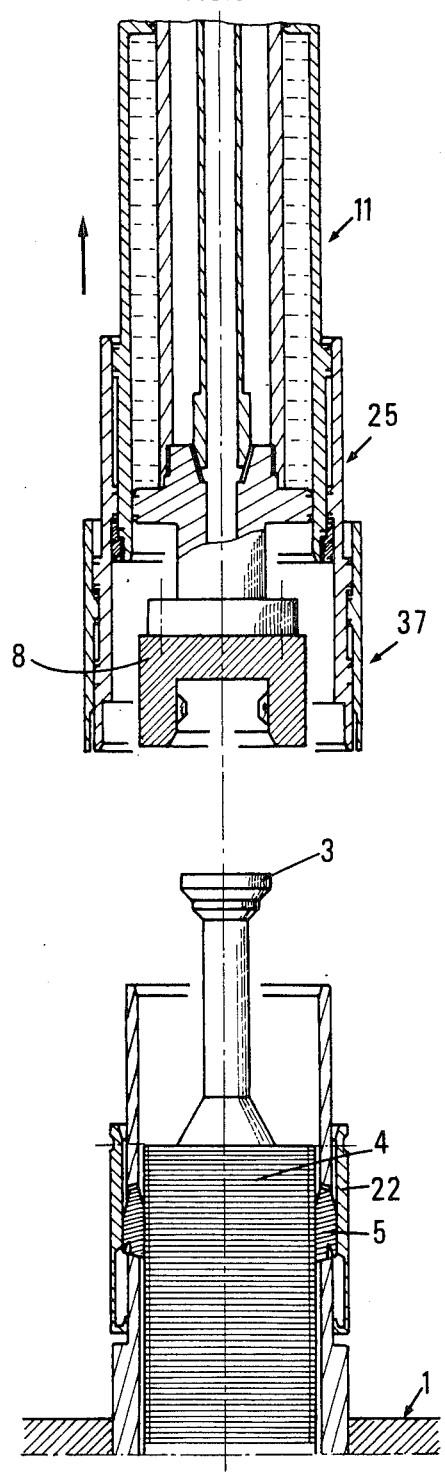

FIG. 8 shows the withdrawal of the different actuators as well as the connector 8.

During the phase for tensioning and fastening the end of the elongate element, the withdrawal actuator 37 has not been used.

This actuating jack 37 for retracting the locking jacket 22 finds it use for unfastening the end 2 of the production line.

For this, the assembly of actuating cylinders of tensioning jack 11, locking actuator jack 25 and 37 for withdrawing jacket 22 and actuator connector 8 are lowered until there is contact between the connector 8 and collar 3. Then the fastening dogs 9 are locked and the main chamber 12 of the tensioning jack 11 is fed with fluid so as to substantially transfer the tensioning forces from the anchorage dogs 5 to the bearing or contact surface 21.

Once that is achieved, the main chamber 27 of the locking actuator jack 25 is fed with fluid until there is contact at 34 between the cylinder 29 of actuator jack 25 and the upper end of the locking jacket 22. At that time, the locking dogs 36 are substantially opposite the groove 35 in the locking jacket 22. It is then sufficient to supply the main chamber 40 of the withdrawal actuator 37 for causing the cylinder of this actuator to move downward which engages dogs 36 in groove 35. The subsidiary chamber 32 of the locking actuator 25 must then be supplied with fluid so as to cause the locking jacket 22 to rise up again and to release the anchorage dogs 5.

This release may be facilitated by fingers 24 which cooperate with the notch 24a located at the base of the anchorage dogs 5.

Release of the dogs 5 may also be facilitated by the shape of the profile of the dogs and of the serrated part, particularly if this profile has a saw tooth shape and if the angle which the saw teeth form with axis 58 differs from 90° and preferably if it is equal to 45°.

With the anchorage dogs 5 released, it is possible to adjust, if required, the tension force exerted by the main actuator tension jack 11 so as to slacken the production line and if required disconnect the production line at its lower part.

Of course, the locking dogs 36 will have to be disengaged from groove 35 before raising the assembly.

This may be achieved by injecting fluid into the subsidiary chamber 43 of actuating jack 37 for withdrawing the locking jacket 22 and so dogs 36 will no longer be locked. A pull exerted on cylinder 29 of locking actuator jack 25 will cause the unlocking dogs 36 to be disengaged from groove 35 because of the slanted shape of the edges of this groove.

What is claimed is:

1. A system for remote tensioning and anchoring of the end of an elongate member having a longitudinal axis on a support comprising:

a receptacle on said support for receiving said elongate element, said receptacle having openings and dogs movably mounted in said openings;

said elongate element having an end portion and a serrated profile on an outer surface fitting within said receptacle and aligned with said dogs;

means to apply a tensioning force to said end portion including a cylinder supported by said receptacle, and a jack having a piston mounted for reciprocating movement in said cylinder;

means supplying a pressurized fluid to the jack to cause the cylinder to press in a direction to supply a compressive force against said support and the piston to move in a direction to supply a tensile force on said one end portion; and means connected to said cylinder for movement therewith, to move said dogs into engagement with the serrated profile to provide anchorage of the elongate element end portion as said compressive force is applied to said support.

2. The system as claimed in claim 1, wherein said end portion is hollow, and fastening means are located inside said end hollow portion.

3. The system as claimed in claim 2, wherein said fastening means include a groove formed inside said end portion and at least one fastening dog integral with the tensioning means, said dog having a profile cooperating with said groove.

4. The system as claimed in claim 3, wherein said fastening dog is housed in an opening formed in cylindrical tube in which a piston slides between two positions, one of these positions corresponding to a position for locking of said fastening dogs in said groove.

5. The system as claimed in claim 1, wherein said compressive force and said tensile force are each comprised by at least one actuating jack.

6. The system as claimed in claim 5, wherein said actuating jack supplying said tensile force includes an annular chamber which, in operation, is substantially coaxial with the end of said elongate element.

7. A system according to claim 1, further comprising a member for locking the anchorage dog in a position for anchoring the end of the elongate element.

8. A device according to claim 6, wherein said means connected to said cylinder comprises a locking jacket for locking the anchorage dogs which is mounted for reciprocating movement parallel to the longitudinal axis of said elongate member.

9. A system according to claim 8, wherein the locking jacket comprises at a lower part thereof at least one finger cooperating with a notch formed in the anchorage dogs.

10. A device according to claim 8, further comprising jack means for retraction of the locking jacket to thereby release the anchorage dogs.

11. A system according to claim 1, wherein the elongate element is a pipe in a pipeline extending from a sea bottom to form part of a sea riser capable of conveying production oil effluent, and the support is an immersed buoy.

12. A system according to claim 1, wherein the tensile force and the compressive force are applied to simultaneously exert a lifting force on said pipe and a downward force on a locking jacket surrounding said receptacle while anchoring said dogs against said serrated profile.

* * * * *